United States Patent
Park et al.

(10) Patent No.: US 9,971,381 B2
(45) Date of Patent: May 15, 2018

(54) WRIST-WEARABLE DISPLAY APPARATUS AND METHOD FOR CONTROLLING THE SAME

(71) Applicant: INDUSTRY-UNIVERSITY COOPERATION FOUNDATION HANYANG UNIVERSITY, Seoul (KR)

(72) Inventors: Jong Il Park, Seoul (KR); Byung-Kuk Seo, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 210 days.

(21) Appl. No.: 14/221,068

(22) Filed: Mar. 20, 2014

(65) Prior Publication Data

US 2015/0029227 A1 Jan. 29, 2015

(30) Foreign Application Priority Data

| Jul. 29, 2013 | (KR) | 10-2013-0089563 |
| Sep. 17, 2013 | (KR) | 10-2013-0111928 |
| Jan. 27, 2014 | (KR) | 10-2014-0009547 |

(51) Int. Cl.
G09G 5/38 (2006.01)
G06F 1/16 (2006.01)
G06F 3/14 (2006.01)

(52) U.S. Cl.
CPC ............ *G06F 1/163* (2013.01); *G06F 1/1622* (2013.01); *G06F 3/1423* (2013.01); *G09G 2340/0492* (2013.01)

(58) Field of Classification Search
CPC .... G06F 1/1613; G06F 3/1423; G06F 1/1622; G06F 1/163; G09G 2340/0492
USPC ................................. 345/655–659
See application file for complete search history.

(56) References Cited

U.S. PATENT DOCUMENTS

| 6,477,117 | B1 | 11/2002 | Narayanaswami et al. |
| 2002/0105778 | A1* | 8/2002 | Harada ........................ 361/681 |
| 2003/0197678 | A1* | 10/2003 | Siddeeq ................. G06F 1/163 345/156 |
| 2004/0207569 | A1* | 10/2004 | Ho ...................... G02F 1/13452 345/1.1 |
| 2005/0110753 | A1* | 5/2005 | Ahn ...................... G06F 1/1622 345/158 |
| 2009/0289958 | A1* | 11/2009 | Kim et al. .................... 345/649 |

(Continued)

FOREIGN PATENT DOCUMENTS

| JP | 1998-224713 A | 8/1998 |
| KR | 20-0172071 Y1 | 3/2000 |

(Continued)

*Primary Examiner* — Ke Xiao
*Assistant Examiner* — Kim-Thanh T Tran (57) ABSTRACT

Disclosed are a wrist-wearable display apparatus and a method of controlling the same. The disclosed wrist-wearable display apparatus includes a hidden display part connected to a wearable part coupled with a wrist; a main display part positioned over the hidden display part; and a rotation part configured to rotate the main display part, where the hidden display part is not exposed if the main display part is in a default initial position, and an area on at least a portion of the hidden display part is exposed if the main display part is rotated.

20 Claims, 10 Drawing Sheets (56) References Cited

U.S. PATENT DOCUMENTS

| | | | | |
|---|---|---|---|---|
| 2009/0295943 A1* | 12/2009 | Kim | ...................... | H04N 5/217 |
| | | | | 348/231.99 |
| 2011/0101913 A1* | 5/2011 | Matsumoto et al. | ......... | 320/107 |
| 2013/0083466 A1* | 4/2013 | Becze | .................. | G06F 3/1438 |
| | | | | 361/679.27 |
| 2013/0113681 A1* | 5/2013 | Zhang | .................. | G06F 1/1626 |
| | | | | 345/1.1 |
| 2013/0217443 A1* | 8/2013 | Lim et al. | ..................... | 455/566 |
| 2013/0222271 A1* | 8/2013 | Alberth | .................. | G06F 1/163 |
| | | | | 345/173 |

FOREIGN PATENT DOCUMENTS

| | | | | |
|---|---|---|---|---|
| KR | 10-0592152 B | | 6/2000 | |
| KR | 20-0266907 Y1 | | 3/2002 | |
| KR | 10-2002-0078617 A | | 10/2002 | |
| KR | 10-2005-0080525 A | | 8/2005 | |
| KR | 10-2006-0054641 A | | 5/2006 | |
| KR | 10-2006-0119589 A | | 11/2006 | |
| KR | 10-2007-0067454 A | | 6/2007 | |
| KR | 10-2008-0043997 A | | 5/2008 | |
| KR | 10-2009-0013129 A | | 2/2009 | |
| KR | 10-2010-0007624 A | | 1/2010 | |
| KR | 1020100007624 A | * | 1/2010 | ............... G06F 1/16 |
| KR | 10-2011-0034851 A | | 4/2011 | |
| KR | 10-2011-0101585 A | | 9/2011 | |
| KR | 10-2012-0069490 A | | 6/2012 | |

* cited by examiner

WRIST-WEARABLE DISPLAY APPARATUS AND METHOD FOR CONTROLLING THE SAME

CROSS-REFERENCE TO RELATED APPLICATIONS

This application claims the benefit of Korean Patent Application No. 10-2013-0089563 (filed on Jul. 29, 2013), No. 10-2013-0111928 (filed on Sep. 17, 2013), and No. 10-2014-0009547 (filed on Jan. 27, 2014) filed with the Korean Intellectual Property Office. The disclosures of the above patent applications are incorporated herein by reference in their entirety.

BACKGROUND

1. Technical Field

Embodiments of the present invention relate to a wrist-wearable display apparatus which can be worn on the wrist and in which the display can be switched between different view modes.

2. Description of the Related Art

In recent times, various forms of wearable display apparatuses have been developed and marketed, examples of which may include smart glasses and smart watches. The smart watch, in particular, refers to a wrist watch that has a system embedded with more advanced functions than those of a regular wrist watch.

The smart watch in its early stages offered basic calculation functions, translation functions, and gaming functions, but the smart watch in its current form may operate mobile applications, etc., and may be used in almost the same way as a conventional smart phone or tablet PC.

However, due to the characteristic of being worn on the user's wrist, the wrist-wearable display apparatus of a smart watch, etc., may not easily employ a display having a size comparable to that of a smart phone, etc. Thus, there is a need for providing various view modes for the user using a relatively smaller display.

SUMMARY

To resolve the problem described above, an aspect of the present invention provides a wrist-wearable display apparatus which can be worn on the wrist and in which the display can be switched between different view modes, as well as a method of controlling the wrist-wearable display apparatus.

Also, an aspect of the present invention provides a wrist-wearable display apparatus, and a method of controlling the wrist-wearable display apparatus, where two display parts are used to provide the user with a wider screen.

To achieve the objectives above, an embodiment of the invention provides a wrist-wearable display apparatus that includes: a display part; a first rotation provider part configured to rotate the display part; and a view control part configured to control a view mode of the display part to be a horizontal view mode or a vertical view mode based on an orientation of the display part.

Another embodiment of the invention provides a wrist-wearable display apparatus that includes: a display part; a wearable part coupled with a wrist; a rotation part coupled with the wearable part and the display part and configured to rotate the display part; and a view control part configured to control a view mode of the display part by detecting a rotation of the rotation part.

Still another embodiment of the invention provides a method of controlling a wrist-wearable display apparatus, which includes a display part and a rotation part. The method includes: detecting a rotation of the display part due to a rotation of the rotation part; and controlling a view mode of the display part to be a horizontal view mode or a vertical view mode based on an orientation of the display part.

The wrist-wearable display apparatus and the method of controlling the display apparatus according to certain embodiments of the invention allow the user to rotate the display in an arbitrary direction for different view modes, to provide the user with greater convenience even with a small display.

Also, the wrist-wearable display apparatus and the method of controlling the display apparatus according to certain embodiments of the invention utilize two screen parts to provide the user with a wider screen.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings.

Figure 1:
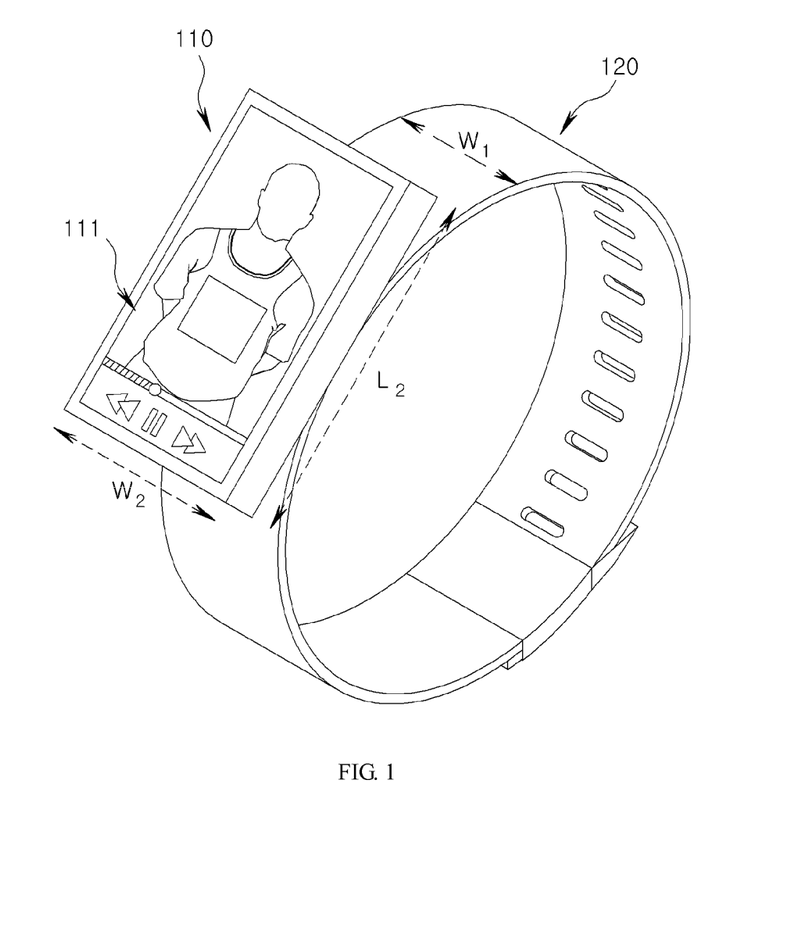
FIG. 1 is a perspective view of a wrist-wearable display apparatus according to a first disclosed embodiment of the invention.
Figure 2:
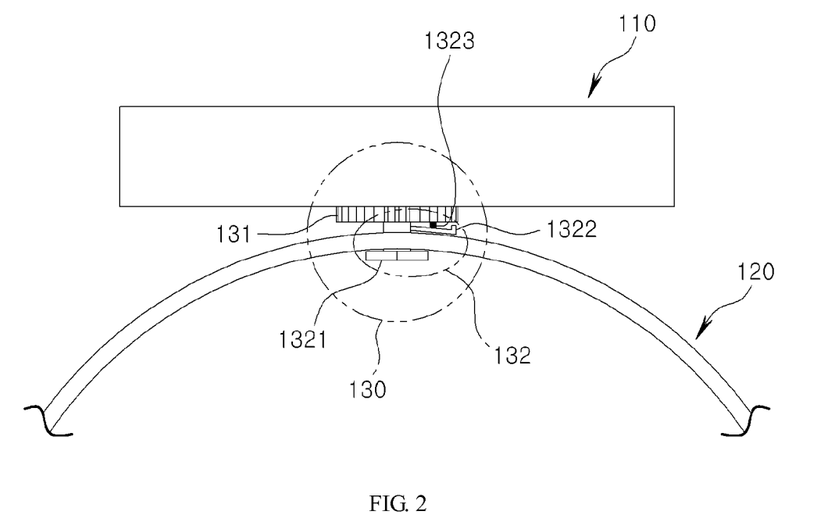
FIG. 2 is a cross-sectional view of a wrist-wearable display apparatus according to the first disclosed embodiment of the invention.
Figure 3:
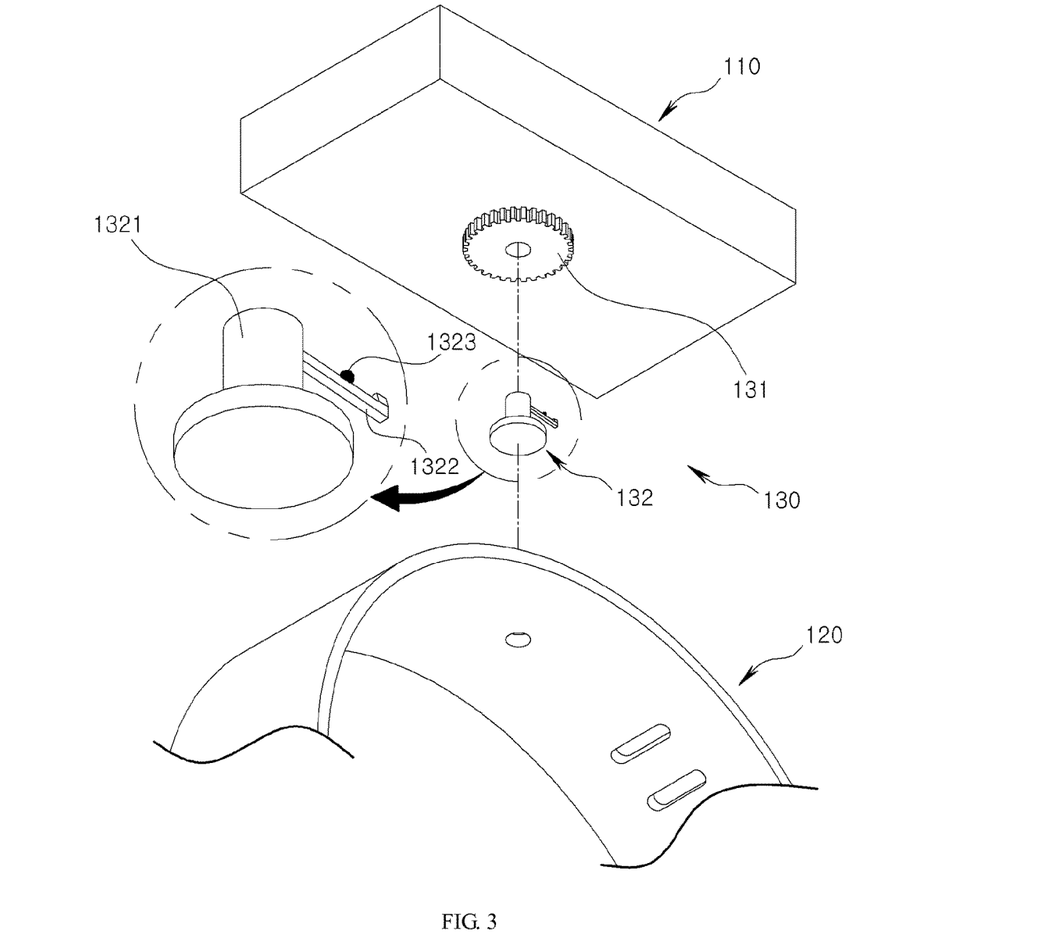
FIG. 3 is an exploded perspective view of a wrist-wearable display apparatus according to the first disclosed embodiment of the invention.

FIG. 1 is a perspective view of a wrist-wearable display apparatus according to a first disclosed embodiment of the invention, FIG. 2 is a cross-sectional view of a wrist-wearable display apparatus according to the first disclosed embodiment of the invention, and FIG. 3 is an exploded perspective view of a wrist-wearable display apparatus according to the first disclosed embodiment of the invention.

Referring to FIG. 1 through FIG. 3, a wrist-wearable display apparatus 100 according to the first disclosed embodiment of the invention may include a main body 110, a wearable part 120, and a rotation part 130. The functions of each component are described below in more detail.

The main body 110 may serve to convey various information and may include a display part 111. The main body 110 can further include an audio part, a view control part, a communication part, a sensor part, etc. (These are not shown in FIG. 1 through FIG. 3) Also, the wearable part 120 can be a watch strap that couples onto the wrist to secure the main body 110 and the display part 111.

According to an embodiment of the invention, the cross sections of the main body 110 and the display part 111 can be rectangular. However, the invention is not limited thus, and the cross sections of the main body 110 and display part 111 can have any of a variety of shapes. For convenience, it will be assumed in the descriptions that the cross sections of the main body 110 and display part 111 is "rectangular".

Looking at the details, the display part 111 (e.g. a touch display) may show visual information, and the audio part (e.g. a speaker) may output auditory information. Examples of visual/auditory information that can be expressed by the display part 111 and audio part may include time information, messages, video clips, voice information, etc.

Also, the communication part may receive data directly through a mobile communication network or an external wireless communication network, such as a WiFi network, etc., or may perform pairing with a smart phone or table PC, etc., to receive data. The sensor part may include at least one sensor, such as an acceleration sensor, a gyroscope sensor, a proximity sensor (e.g. a magnetic proximity sensor), etc.

The view control part may control the viewing of visual information on the display part 111, and may control the view mode of the display part 111 to be in a "horizontal view mode" or a "vertical view mode" based on the orientation of the display part 111.

Figure 4:
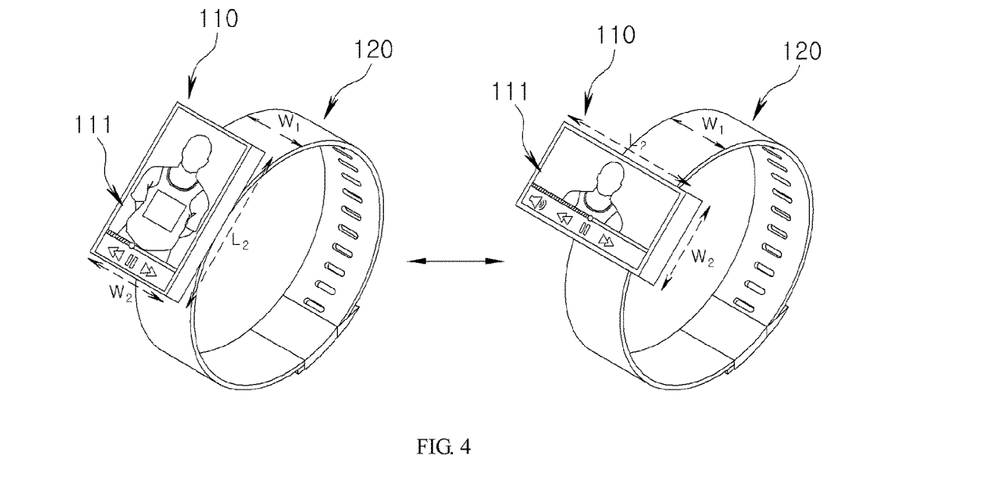
FIG. 4 is a perspective view of a rotatable wrist-wearable display apparatus according to the first disclosed embodiment of the invention.

For instance, if the width direction ($W_1$) of the wearable part 120 is aligned with the width direction ($W_2$) of the display part 111 as in the left picture of FIG. 4, then it can be assumed that the display part 111 is "vertically oriented", and the view control part can control (i.e. maintain or change) the view mode of the display part 111 to be in the "vertical view mode".

Conversely, if the width direction ($W_1$) of the wearable part 120 is aligned with the length direction ($L_2$) of the display part 111 as in the right picture of FIG. 4, then it can be assumed that the display part 111 is "horizontally oriented", and the view control part can control the view mode of the display part 111 to be in the "horizontal view mode".

According to an embodiment of the invention, the display part 111 can be rotated by a preset angle or greater, while the wrist-wearable display apparatus 100 is being worn by a user, to be placed in a horizontal or a vertical orientation. In other words, while worn by the user, the display part 111 can be rotated left (⌒) or right (⌒), from the viewpoint of the user looking at the display part 111, but not upwards (⊙) or downwards (⊗).

The view control part will be described later on in further detail.

The rotation part 130 may rotate the main body 110 or the display part 111 to adjust the orientation. For convenience, the components rotated by the rotation part 130 will be referred to collectively as the "display part 111".

Looking at the details, the rotation part 130 can include a first rotation provider part 131 that is connected with the display part 111 and a second rotation provider part 132 that is connected with the first rotation provider part 131 and the wearable part 120. The first rotation provider part 131 can be coupled with the second rotation provider part 132 to rotate the display part 111.

According to an embodiment of the invention, the second rotation provider part 132 can be secured to the wearable part 120, and the first rotation provider part 131 can rotate over the second rotation provider part 132 and thereby rotate the display part 111. Here, the rotation angle can be designed in various ways. For instance, the display part 111 can be designed to rotate within a range of ±90° from the initial vertical orientation shown in the left picture of FIG. 4, or to rotate 360° in any direction.

Figure 5:
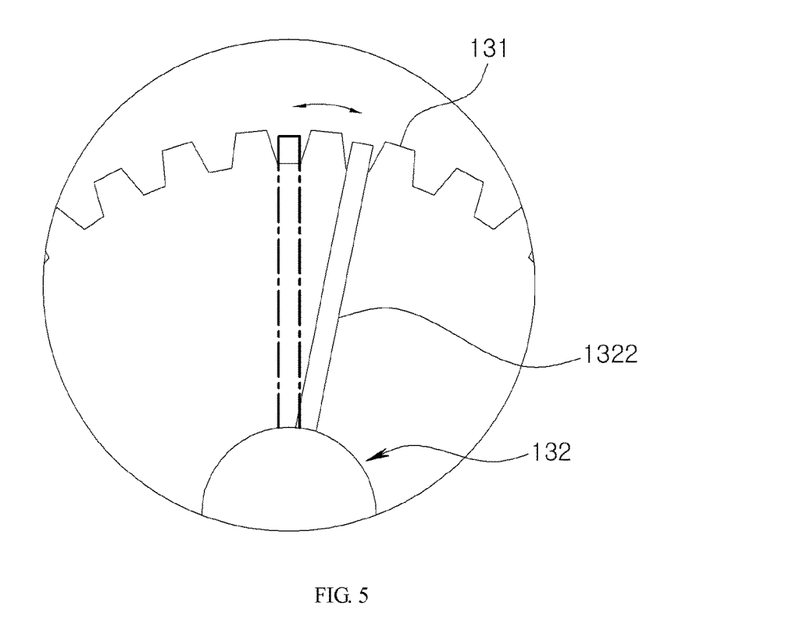
FIG. 5 illustrates the composition of the rotation part in a wrist-wearable display apparatus according to the first disclosed embodiment of the invention.

Also, according to an embodiment of the invention, at least one of the first rotation provider part 131 and the second rotation provider part 132 can have a cogwheel-like structure. For example, as illustrated in FIG. 2, FIG. 3, and FIG. 5, the first rotation provider part 131 can have a cogwheel-like structure, while the second rotation provider part 132 may include a bolt 1321, a detent 1322 that rotates the cogwheel structure, and an elastic member 1323 (e.g. a spring) that moves the detent 1322 up and down. That is, the detent 1322 may move to an adjacent cog as it is moved up and down by the elastic member 1323, and accordingly, the first rotation provider part 131 having a cogwheel structure can be rotated left or right by the second rotation provider part 132.

The same scheme for view mode control can be applied even when the display part 111 has a non-regular shape (e.g. an ellipse, a rhombus, etc.) instead of a rectangular shape.

To be more specific, for a regular shape, a longitudinal length and a lateral length can be defined which are orthogonal to each other and which pass through the center of the shape. Here, assuming that the relatively longer length is the longitudinal length and the relatively shorter length is the lateral length, the direction corresponding to the longitudinal length may be defined as the length direction and the direction corresponding to the lateral length may be defined as the width direction. Then, the orientation of the display part 111 can be determined in the same way as described above, and the view mode can be controlled based on the orientation thus determined.

The composition of the rotation part 130 described above is merely one example for an embodiment of the invention, and various other compositions can be used for the rotation part 130, such as the rotation structure employed in a Rubik's cube, the rotation structure employed in a 90°-rotatable monitor, and the like.

Also, the first rotation provider part 131 and the second rotation provider part 132 forming the rotation part 130 can be detachably coupled to each other, and can be manufactured/sold separately from the display part 111 and wearable part 120. Thus, various combinations with the display part 111 and wearable part 120 are possible.

The wrist-wearable display apparatus 100 can further include a rotation detector part (now shown in FIG. 1 through FIG. 3) for detecting the rotation of the display part 111. In this case, the rotation detector part can be included within the main body 110 or can be included as a separate component. If the rotation detector part is included in the main body 110, the rotation detector part can include the sensor part described above or can be connected to the sensor part.

According to an embodiment of the invention, the rotation detector part can detect the rotation of the display part 111 by detecting a rotation by the rotation part 130, particularly the first rotation provider part 131. That is, the rotation detector part can generate information regarding a detected rotation by using the "rotated angle" of the first rotation provider part 131 and second rotation provider part 132.

For example, in cases where the rotation part 130 has the structure illustrated in FIG. 2, FIG. 3, and FIG. 5, the rotation detector part can generate the information regarding the detected rotation based on the number of times the detent 1322 moved to an adjacent cog.

In the following, a description is provided of the specific operations of the view control part for controlling the view mode of the display part 111 to be in a "horizontal view mode" or a "vertical view mode" based on the orientation of the display part 111.

According to an embodiment of the invention, the view control part can control the view mode of the display part 111 by using the information on detected rotation as measured at the rotation detector part.

For instance, in cases where the rotation part 130 has the structure illustrated in FIG. 2, FIG. 3, and FIG. 5, the rotation detector part can identify whether the orientation of the display part 111 is in a "horizontal orientation" or a "vertical orientation" based on the number of times the detent 1322 moved to an adjacent cog, and the view control part can control the view mode of the display part 111 based on this information.

For example, as in the left picture of FIG. 4, if the rotation detector part measures the rotation angle to be 0° or 180° based on the number of times the detent 1322 moved to an adjacent cog, then the view control part can identify from the rotation angle that the display part 111 is in a "vertical orientation", and can then control the view mode of the display part 111 to be in the "vertical view mode".

Conversely, as in the right picture of FIG. 4, if the rotation detector part measures the rotation angle to be 90° or 270° based on the number of times the detent 1322 moved to an adjacent cog, then the view control part can identify from the rotation angle that the display part 111 is in a "horizontal orientation", and can then control the view mode of the display part 111 to be in the "horizontal view mode".

Also, according to another embodiment of the invention, at least one sensor included in or connected with the rotation detector part can measure information related to the orientation of the display part 111, and the view control part can control the view mode of the display part 111 by using the information measured by the at least one sensor.

For instance, the sensor part can use a gyroscope sensor, a proximity sensor, etc., to identify whether the display part 111 is in a "horizontal orientation" or a "vertical orientation", and the view control part can control the view mode of the display part 111 to the "horizontal view mode" or the "vertical view mode" based on the information measured by the sensor part.

Also, according to yet another embodiment of the invention, the view control part can determine the orientation and mode of the display part 111 by using both the detected rotation information of the rotation part 130 and information measured by at least one sensor.

There can be certain situations in which the display part 111, instead of being oriented at an angle divisible by 90° (0°, 90°, 180°, 270°), is oriented at a somewhat oblique angle (e.g. 69°, 155°). The view control part can control the view mode of the display part 111 to the "horizontal view mode" or the "vertical view mode" if the orientation of the display part 111 is within a preset range from an angle divisible by 90°. In one example, the display part 111 can be made to rotate in units of 90°, and the view control part can control the view mode of the display part 111 to be in the "horizontal view mode" or the "vertical view mode".

In summary, in a wrist-wearable display apparatus 100 according to an embodiment of the invention, if the display part 111 is in a "vertical orientation", then the view mode of the display part 111 can be controlled to the "vertical view mode" (for showing time information, for example), and if the display part 111 is in a "horizontal orientation", then the view mode of the display part 111 can be controlled to the "horizontal view mode" (for playing video clips or checking text information, for example), to provide the user with greater convenience when checking information.

Figure 6:
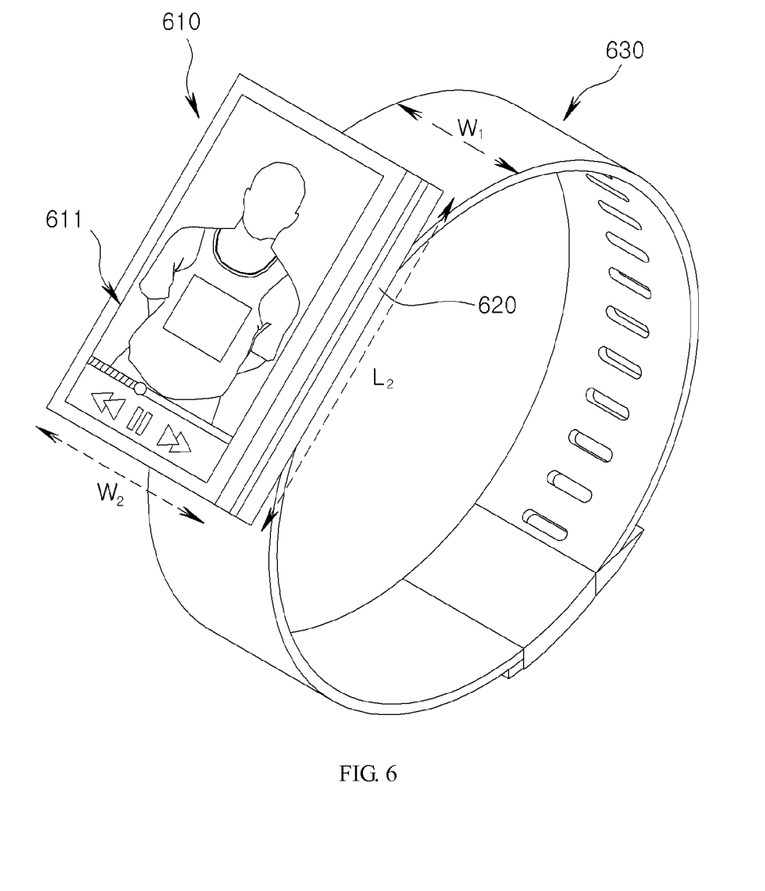
FIG. 6 is a perspective view of a wrist-wearable display apparatus according to a second disclosed embodiment of the invention.
Figure 7:
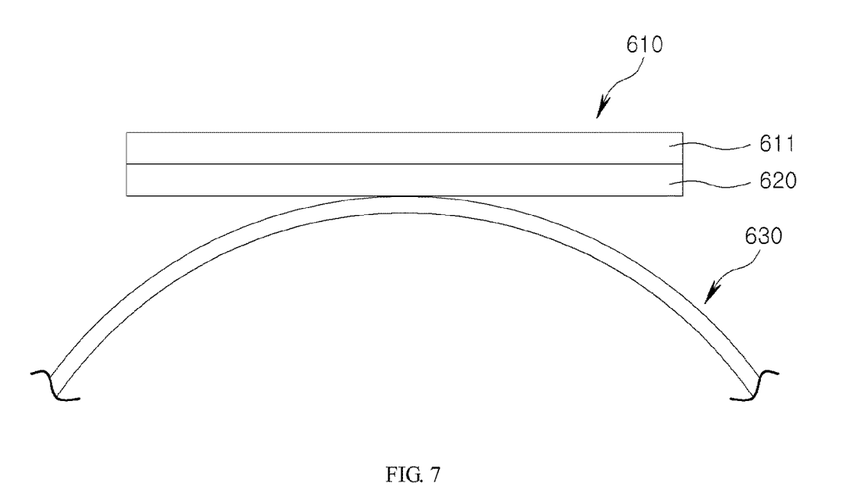
FIG. 7 is a cross-sectional view of a wrist-wearable display apparatus according to the second disclosed embodiment of the invention.
Figure 8:
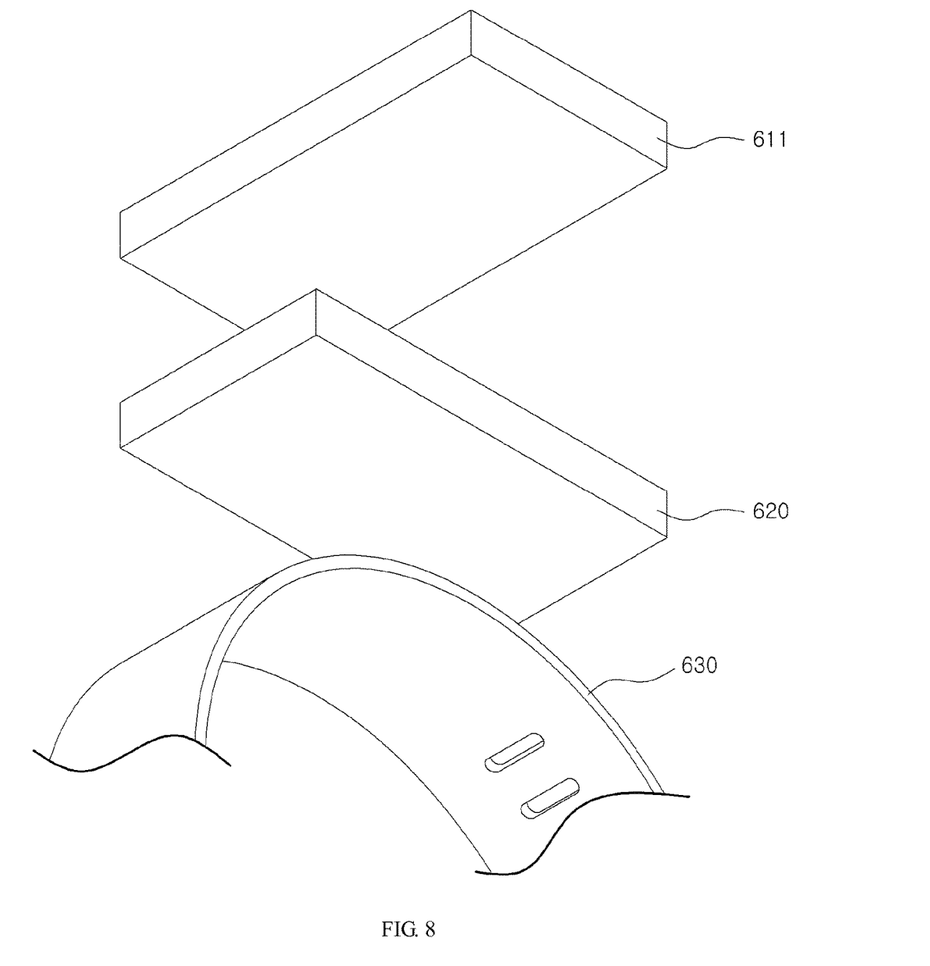
FIG. 8 is an exploded perspective view of a wrist-wearable display apparatus according to the second disclosed embodiment of the invention.

FIG. 6 is a perspective view of a wrist-wearable display apparatus according to a second disclosed embodiment of the invention, FIG. 7 is a cross-sectional view of a wrist-wearable display apparatus according to the second disclosed embodiment of the invention, and FIG. 8 is an exploded perspective view of a wrist-wearable display apparatus according to the second disclosed embodiment of the invention. The functions of each component are described below in more detail.

The main body 610 may include a display part 611, a view control part, etc. and may serve to convey various information. The main body 610 can be substantially the same as the main body 110 of the first disclosed embodiment described above, and as such, further descriptions will be omitted. However, the display part 611 included in the main body 610 will be referred to as a "main display part" or a "second display part".

Also, another display part 620 that is not included in the main body 610 is a hidden display part which may or may not be exposed under different circumstances. Its lower surface may be coupled or connected with the wearable part 630, while its upper surface may have the main body 610 or the main display part 611 positioned thereon. The display part 620 that is not included in the main body 610 will be referred to as a "hidden display part" or a "first display part".

In different embodiments of the invention, the cross sections for the main body 610, main display part 611, and hidden display part 620 can take various shapes, but in the descriptions that follow, it will be assumed for convenience that the cross sections are rectangular in shape.

A wrist-wearable display apparatus 600 according to the second disclosed embodiment of the invention can include a rotation part that rotates the main body 610 or the main display part 611. Here, the rotation part can have any of a variety of rotation structures.

The view control part may control the showing of visual information on each of the main display part 611 and the hidden display part 620, and may control the view mode of the main display part 611 to be in a "horizontal view mode" or a "vertical view mode" based on the orientation of the main display part 611.

According to an embodiment of the invention, if the main display part 611 is not rotated and is in a default initial position, the hidden display part 620 may not be exposed. In this case, the view control part can provide control such that there is no visual information shown on the hidden display part 620 and there is visual information shown on the main display part 611.

Also, according to an embodiment of the invention, if the main display part 611 is rotated by a particular angle from the default initial position, an area on at least a portion of the hidden display part 620 can be exposed. In this case, the view control part can provide control such that visual information is shown on both the main display part 611 and the area on at least a portion of the hidden display part 620.

Figure 9:
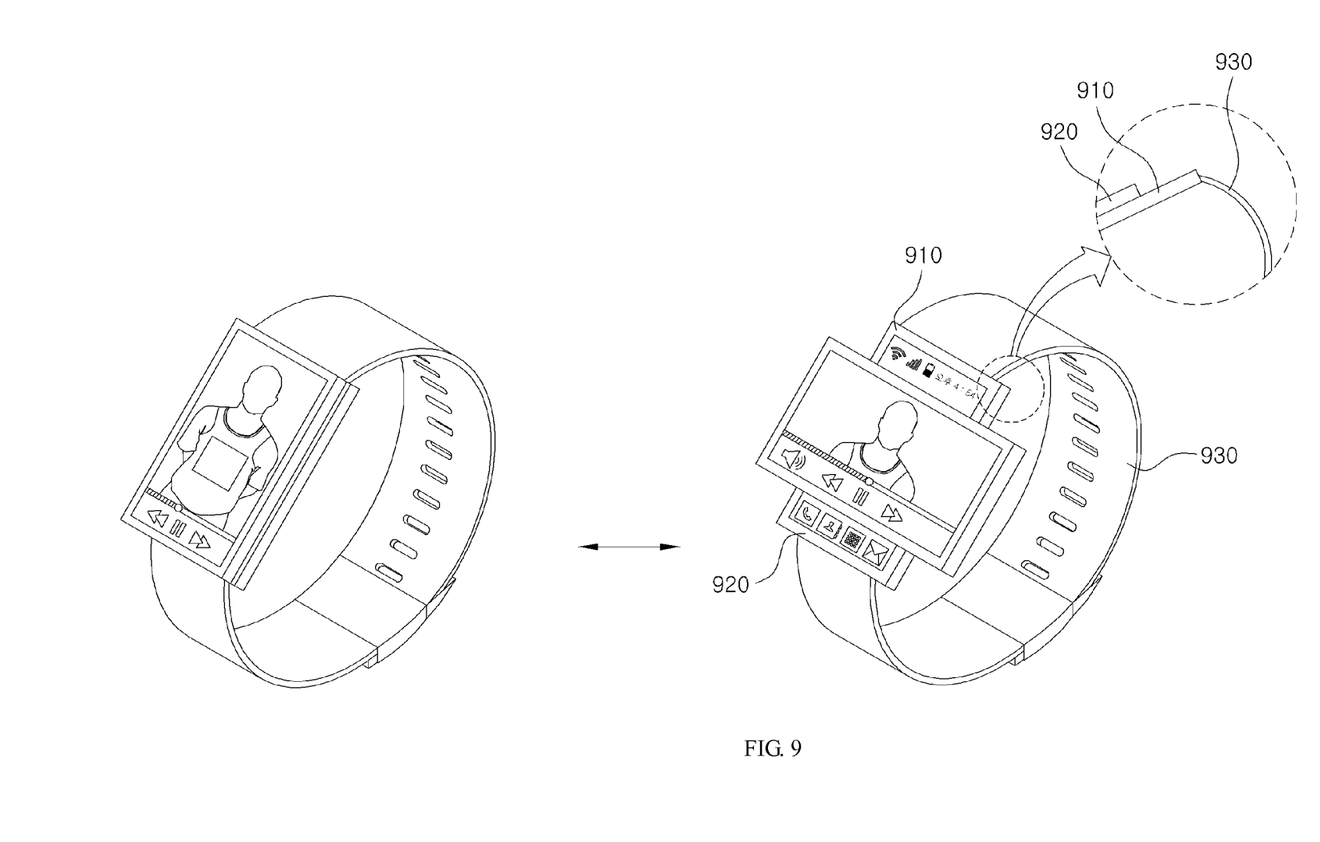
FIG. 9 and FIG. 10 illustrate ways in which information can be shown on a wrist-wearable display apparatus according to the second disclosed embodiment of the invention.

For instance, if the hidden display part 620 is in a "vertical orientation" and the initial position of the main display part 611 is also in a "vertical orientation" as in the left picture of FIG. 9, then the main display part 611 may be superimposed over the hidden display part 620 from the viewpoint of the user looking at the display apparatus, and thus the hidden display part 620 may not be exposed. Therefore, the view control part can provide control such that the view mode of the main display part 611 is in the "vertical view mode", with no visual information shown on the hidden display part 620, and visual information shown on the main display part 611.

Conversely, if the hidden display part 620 is in a "vertical orientation" and the main display part 611, from the initial position of a "vertical orientation", is rotated by a particular angle in the plane viewed by the user to be placed in a "horizontal orientation" as in the right picture of FIG. 9, then a first area 910 and a second area 920, which correspond to at least a portion of the hidden display part 620, may be exposed. Therefore, the view control part can provide control such that the view mode of the main display part 611 is in the "horizontal view mode", with visual information shown on both the areas (the first area 910 and second area 920) on at least a portion of the hidden display part 620 and the main display part 611.

In FIG. 9, the wearable part 630 can be structured such that it is connected to both ends of the main body 610, similar to the case of a regular wrist watch.

Figure 10:
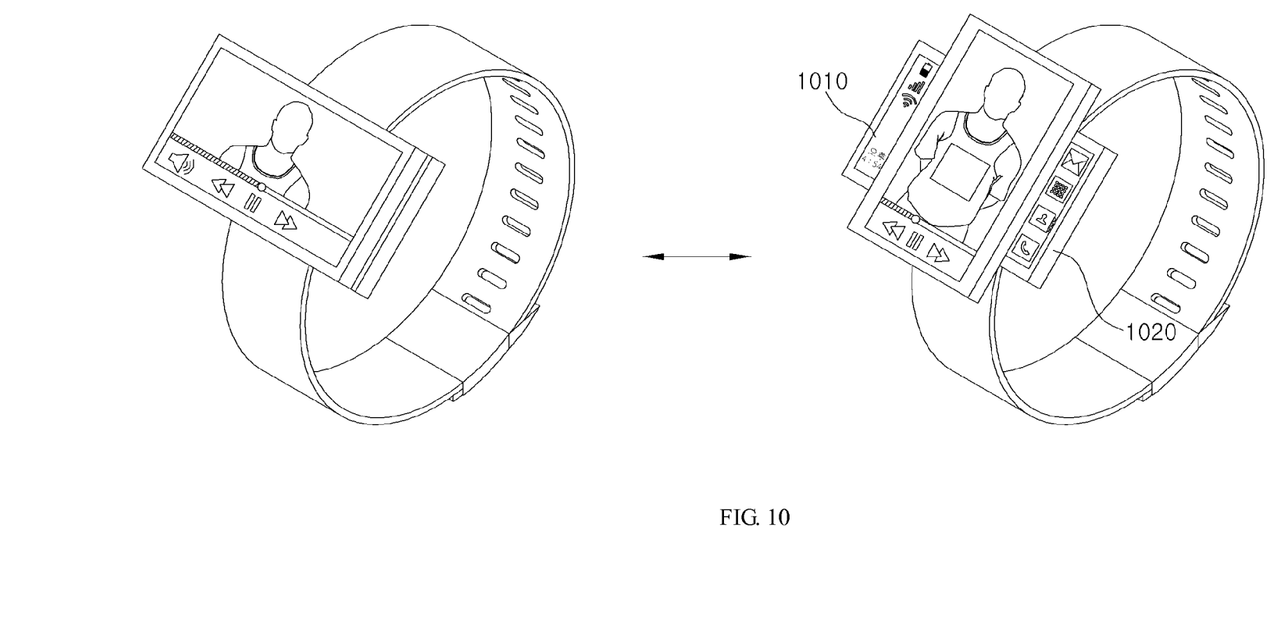

In another example, if the hidden display part 620 is positioned in a "horizontal orientation" and the initial position of the main display part 611 is also in a "horizontal orientation" as in the left picture of FIG. 10, then the main display part 611 may be superimposed over the hidden display part 620 from the viewpoint of the user looking at the display apparatus, and thus the hidden display part 620 may not be exposed. Therefore, the view control part can provide control such that the view mode of the main display part 611 is in the "horizontal view mode", with no visual information shown on the hidden display part 620 and visual information shown on the main display part 611.

Conversely, if the hidden display part 620 is in a "horizontal orientation" and the main display part 611, from the initial position of a "horizontal orientation", is rotated by a particular angle in the plane viewed by the user to be placed in a "vertical orientation" as in the right picture of FIG. 10, then a third area 1010 and a fourth area 1020, which correspond to at least a portion of the hidden display part 620, may be exposed. Therefore, the view control part can provide control such that the view mode of the main display part 611 is in the "vertical view mode", with visual information shown on both the areas (the third area 1010 and fourth area 1020) on at least a portion of the hidden display part 620 and the main display part 611.

While a design can have the entire hidden display part 620 formed as a display panel, it is also possible to have display panels positioned only at the areas on the exposed portions (e.g. on the first area 910 and second area 920 only)

Also, the visual information shown on an area on at least a portion of the hidden display part 620 can be set beforehand by an installed program or can be set by the user.

According to an embodiment of the invention, the visual information shown on the main display part 611 in its initial position may include main information (e.g. messages, e-mail, video clips, etc.) and supplementary information (e.g. current time, remaining battery power, list of frequently used applications, etc.). When the main display part 611 is rotated, the view control part can provide control such that the main information is shown on the main display part 611 while the supplementary information is shown on an area on at least a portion of the hidden display part 620.

For instance, if the hidden display part 620 is in a "vertical orientation" and the main display part 611 is rotated from its initial position to a "horizontal orientation", as illustrated in FIG. 9, so that the visual information is shown in the "horizontal view mode", then a "video clip", i.e. the main information, can be shown on the main display part 611, while a "current time, remaining battery power, list of frequently used applications, etc.", i.e. the supplementary information, can be shown on the first area 910 and second area 920 of the hidden display part 620.

According to another embodiment of the invention, if the main display part 611 is rotated, the view control part can provide control such that the visual information is divided between the main display part 620 and the areas on at least a portion of the hidden display part 611. Here, the visual information shown on the hidden display part 620 can be shown in a modified format suitable for the specifications of the hidden display part 620.

Although the descriptions above refer to the rotation part being positioned between the hidden display part 620 and the main display part 611, another embodiment of the invention can have the rotation part positioned between the wearable part 630 and the hidden display part 620. Also, in yet another embodiment of the invention, the rotation part can include a first rotation part positioned between the wearable part 630 and the hidden display part 620 and a second rotation part positioned between the hidden display part 620 and the main display part 611.

In this case, the rotation part can rotate at least one of the hidden display part 620 and the main display part 611, and in certain occasions, can rotate the hidden display part 620 and the main display part 611 both.

Thus, when the hidden display part 620 and the main display part 611 are superimposed in the plane viewed by the user as a result of a rotation by the rotation part, the hidden display part 620 may not be exposed, and control can be provided such that visual information is shown on the main display part 611 while visual information is not shown on the hidden display part 620. Also, when the hidden display part 620 and the main display part 611 are not superimposed in the plane viewed by the user as a result of a rotation by the rotation part, at least a portion of the hidden display part 620 may be exposed, and control can be provided such that visual information is shown on both the main display part 611 and the areas on at least a portion of the hidden display part 620.

In this way, a wrist-wearable display apparatus 600 according to the second disclosed embodiment of the invention can use two display parts 611, 620 to provide the user with a wider screen.

The wrist-wearable display apparatus 600 can also further include a rotation detector part for detecting the rotation of the main display part 611. Similar to the case of a wrist-wearable display apparatus 100 according to the first disclosed embodiment of the invention, the rotation detector part can determine the orientation of the main display part 611 by using both detected rotation information from the rotation part and information measured by at least one sensor.

According to an embodiment of the invention, the rotation part can include a first rotation provider part that is connected with the main display part 611 and a second rotation provider part that is connected with the hidden display part 620, and the first rotation provider part and second rotation provider part can be coupled to rotate the main display part 611. In this case, the rotation detector part can detect the rotation of the main display part 611 by using the rotated angles of the first rotation provider part and second rotation provider part. This is substantially the same as the rotation detector part of a wrist-wearable display apparatus 600 based on the first disclosed embodiment of the invention, and as such, further descriptions will be omitted.

According to another embodiment of the invention, the rotation detector part can include a proximity sensor which may be installed on at least one location on the main display part 611 and the areas on at least a portion of the hidden display part 620. For example, the rotation of the main display part 611 can be detected by using a proximity sensor positioned on the first area 910 or the second area 920 of the hidden display part 620 or on the main display part 611. The composition of the rotation detector part can be made even simpler when the rotation detector part is implemented with proximity sensors.

In one example, in cases where the hidden display part 620 is arranged as illustrated in FIG. 9, the rotation detector part can include a magnetic sensor which may be installed on at least one location on the first area 910 and second area 920 or on the main display part 611. A magnetic substance can be included in portions that contact the magnetic sensor.

A wrist-wearable display apparatus 600 according to the second disclosed embodiment of the invention can further include a first battery and a second battery for supplying power. Here, the first battery can be included in or be installed at a position adjacent to the main body 610 or the main display part 611, while the second battery can be included in or be installed at a position adjacent to the hidden display part 620. In one example, the first battery can be the main battery and the second battery can be an auxiliary battery, and the transfer of power between the two batteries can be achieved by wired or wireless means.

Figure 11:
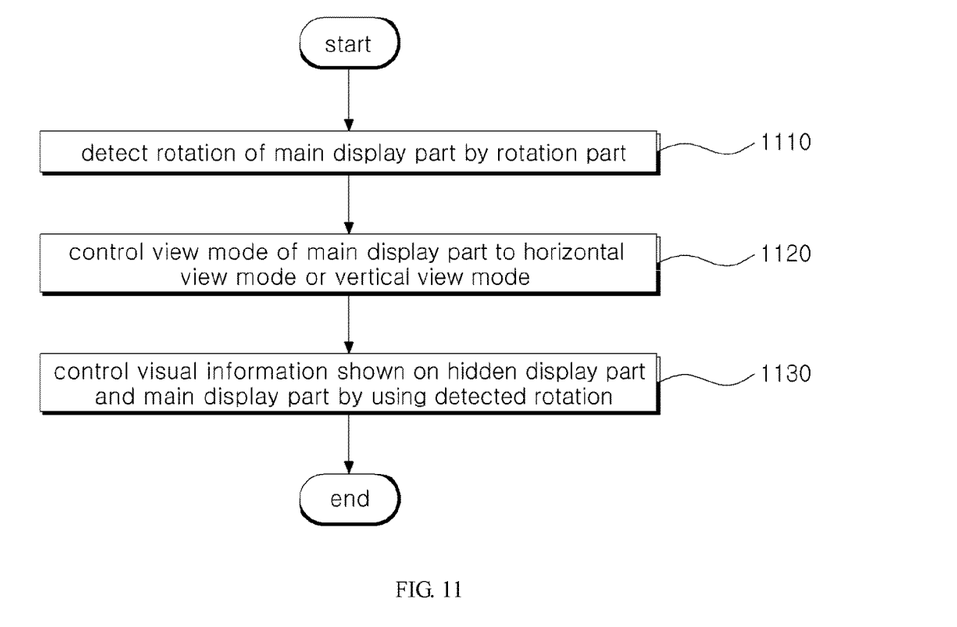
FIG. 11 is a flowchart illustrating a method of controlling a wrist-wearable display apparatus according to an embodiment of the invention.

FIG. 11 is a flowchart illustrating a control method for a wrist-wearable display apparatus according to an embodiment of the invention.

Here, the control method can be applied to a wrist-wearable display apparatus 100 according to the first disclosed embodiment of the invention and to a wrist-wearable display apparatus 600 according to the second disclosed embodiment of the invention. The procedure for each operation is described below.

In operation 1110, the rotation of the display part, i.e. the main display part may be detected.

According to an embodiment of the invention, in operation 1110, the rotation of the display part can be detected by way of the rotation of the rotation part coupled to the main display part and the wrist band (i.e. wearable part).

Then, in operation 1120, the view mode of the main display part may be controlled to the horizontal view mode or the vertical view mode based on the orientation of the main display part.

Also, operation 1130 can be applied to a wrist-wearable display apparatus 600 according to the second disclosed embodiment of the invention. That is, in operation 1130, the visual information shown on the main display part and the hidden display part may be controlled by using the detected rotation.

According to an embodiment of the invention, in operation 1130, if the main display part is in a default initial position, then the hidden display part may not be exposed, and only the visual information shown on the main display part can be controlled. If the main display part is rotated, then the visual information shown in an area on at least a portion of the hidden display part can be controlled, as well as the visual information shown on the main display part.

The descriptions above relate to methods for controlling a wrist-wearable display apparatus according to an embodiment of the invention. The features of a wrist-wearable display apparatus 100, 600 described above with reference to FIG. 1 through FIG. 10 may also be applied to this embodiment. As such, further descriptions will be omitted.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A wrist-wearable display apparatus comprising:
   a hidden display part connected with a wearable part coupled with a wrist;
   a main display part positioned over the hidden display part;
   a rotation part connected with the hidden display part and a wearable part coupled with the wrist and configured to rotate wherein each of the main display part and the hidden display part, can be rotated and the main display part is positioned over the hidden display part;

a first rotation provider part connected with the main display part and configured to rotate the main display part; and a view controller to control visual information shown on the main display part and the hidden display part, wherein an orientation of the main display part is in a horizontal orientation or in a vertical orientation by the rotation part, wherein the main display part and the hidden display part are arranged in a cross shape and at least a portion of the hidden display part is exposed when at least one of the main display part and the hidden display is rotated.

2. The wrist-wearable display apparatus of claim 1, further comprising: at least one sensor configured to measure information related to the orientation of the main display part, wherein the view controller controls a view mode of the main display part by using the information measured by the at least one sensor.

3. The wrist-wearable display apparatus of claim 1, further comprising:

a rotation detector part configured to measure information related to the orientation of the main display part by detecting a rotation of the rotation part, wherein the view controller controls a view mode of the main display part by using the information measured by the rotation detector part.

4. The wrist-wearable display apparatus of claim 3, the rotation part comprising:

a first rotation part positioned between the hidden display part and the wearable part; and a second rotation part positioned between the hidden display part and the main display part.

5. The wrist-wearable display apparatus of claim 4, wherein the first rotation part is coupled with the second rotation part to rotate the main display part.

6. The wrist-wearable display apparatus of claim 1, wherein the view controller controls a view mode of the main display part to be a horizontal view mode or a vertical view mode based on the orientation of the main display part.

7. The wrist-wearable display apparatus of claim 1, wherein the exposed portion of the hidden display part comprises a first area and a second area, wherein main information is displayed on the main display part and supplemental information is displayed on both the first area and the second area of the hidden display part.

8. The wrist-wearable display apparatus of claim 1, wherein, if the main display part is in the default initial position, the view controller provides control such that visual information is not shown on the hidden display part and visual information is shown on the main display part, and if the main display part is rotated, the view controller provides control such that visual information is shown on both the main display part and the exposed portion of the hidden display part.

9. The wrist-wearable display apparatus of claim 8, wherein the visual information shown on the main display part in the default initial position includes main information and supplementary information, and if the main display part is rotated, the view controller provides control such that the main information is shown on the main display part and the supplementary information is shown on the exposed portion of the hidden display part.

10. The wrist-wearable display apparatus of claim 8, wherein, if the main display part is rotated, the view controller provides control such that the visual information is shown divided between the main display part and the exposed portion of the hidden display part.

11. The wrist-wearable display apparatus of claim 1, further comprising:

a first battery and a second battery for supplying power, wherein the first battery is installed at a position adjacent to the main display part, and the second battery is installed at a position adjacent to the hidden display part.

12. A method of controlling a wrist-wearable display apparatus, the method comprising:

detecting a rotation of a main display part based on a rotation of a rotation part;

controlling a view mode of the main display part based on an orientation of the main display part; and controlling visual information shown on the main display part and a hidden display part, wherein the main display positioned over the hidden display part and each of the main display part and the hidden display part wherein the rotation part is connected with the hidden display part and a wearable part coupled with a wrist wherein the controlling the view mode of the main display part further comprises the view mode of the main display part to be a horizontal view mode or a vertical view mode based on the orientation of the main display part, wherein the main display part and the hidden display part are arranged in a cross shape and at least a portion of the hidden display part is exposed when at least one of the main display part and the hidden display part is rotated.

13. The method of claim 12, wherein the wrist-wearable display apparatus further comprises at least one sensor configured to measure information related to the orientation of the main display part, and the controlling the view mode of the main display part further comprises controlling the view mode of the main display part by using the information measured by the at least one sensor.

14. The method of claim 12, wherein the detecting comprises detecting a rotated angle of the rotation part to measure information related to the orientation of the main display part, and the controlling the view mode of the main display part further comprises controlling the view mode of the main display part by using the information measured by detecting the rotated angle of the rotation part.

15. The method of claim 12, wherein the controlling visual information further comprises:

controlling visual information shown on the main display part without exposing the hidden display part, if the main display part is in the default initial position, and controlling visual information shown on the exposed portion of the hidden display part and the main display part, if the main display part is rotated.

16. The method of claim 12, wherein the controlling the view mode of the main display part further comprises controlling the view mode of the main display part to a horizontal orientation mode or a vertical orientation mode while the wrist-wearable display apparatus is worn.

17. The method of claim 12, wherein the exposed portion of the hidden display part comprises a first area and a second area, and main information is displayed on the main display part and supplemental information is displayed on both the first area and the second area of the hidden display part.

18. The wrist-wearable display apparatus of claim 4, wherein the first rotation part and the second rotation part are detachably coupled with each other, wherein the second display part rotates over the first display part to rotate the main display part.

19. The wrist-wearable display apparatus of claim 9, wherein the main information includes messages, email, and video clips and the supplementary information shown on the first area and the second area includes current time, remaining battery power, and list of frequently used applications.

20. The method of claim 12, wherein the rotation part comprises a first rotation part positioned between the hidden display part and the wearable part and a second rotation part positioned between the hidden display part and the main display part.

* * * * *